United States Patent [19]

Hein et al.

[11] Patent Number: 4,586,187

[45] Date of Patent: Apr. 29, 1986

[54] CONTROL APPARATUS FOR CONTROLLING MOVEMENTS OF AN ELECTRODE IN AN ELECTRIC ARC FURNACE

[75] Inventors: Theo Hein; Götz Holtfreter, both of Lohr, Fed. Rep. of Germany

[73] Assignee: Mannesmann Rexroth GmbH, Fed. Rep. of Germany

[21] Appl. No.: 552,456

[22] Filed: Nov. 16, 1983

[30] Foreign Application Priority Data

Nov. 20, 1982 [DE] Fed. Rep. of Germany ....... 3242934

[51] Int. Cl.$^4$ .............................................. H05B 7/156
[52] U.S. Cl. .................................... 373/106; 373/105
[58] Field of Search ................ 373/104, 105, 106, 68, 373/77, 110, 140; 423/442

[56] References Cited

U.S. PATENT DOCUMENTS

| | | | |
|---|---|---|---|
| 2,921,107 | 1/1960 | Toothman et al. | 373/106 |
| 2,989,616 | 6/1961 | Mironoff | 373/106 |
| 3,173,052 | 3/1965 | Moore | 373/106 |
| 3,300,562 | 1/1967 | Moore | 373/106 |
| 4,213,955 | 6/1980 | Casciani et al. | 423/442 |
| 4,324,944 | 4/1982 | Weilrich et al. | 373/105 |

FOREIGN PATENT DOCUMENTS

| | | |
|---|---|---|
| 729234 | 8/1952 | United Kingdom . |
| 1288977 | 12/1969 | United Kingdom . |
| 0604201 | 4/1978 | U.S.S.R. ............................. 373/106 |

Primary Examiner—Harry E. Moose, Jr.
Assistant Examiner—Gregory D. Thompson
Attorney, Agent, or Firm—Harness, Dickey & Pierce

[57] ABSTRACT

The electrode of an electric arc melting furnace is adjusted in height by a hydraulic cylinder having an operating chamber which is connected via a servo valve to a hydraulic pressure source or, respectively, to a reservoir. The servo valve is actuated by a control signal which is produced by a comparison of the actual value of the electric arc current and a predetermined desired current value. Additionally, the pressure in the operating chamber of the cylinder is measured and supplied to the control circuit as a feedback value. An important advantage deriving from the present invention is the ability to provide a control of the electrode motion by virtue of the measured pressure even before the electric arc is ignited and to steadily hydraulically support the electrode under any condition of operation. Accordingly, uncontrolled motions of the electrode are prevented which motions might result in an increased danger of breakage, in overcurrents or short-circuits.

12 Claims, 1 Drawing Figure

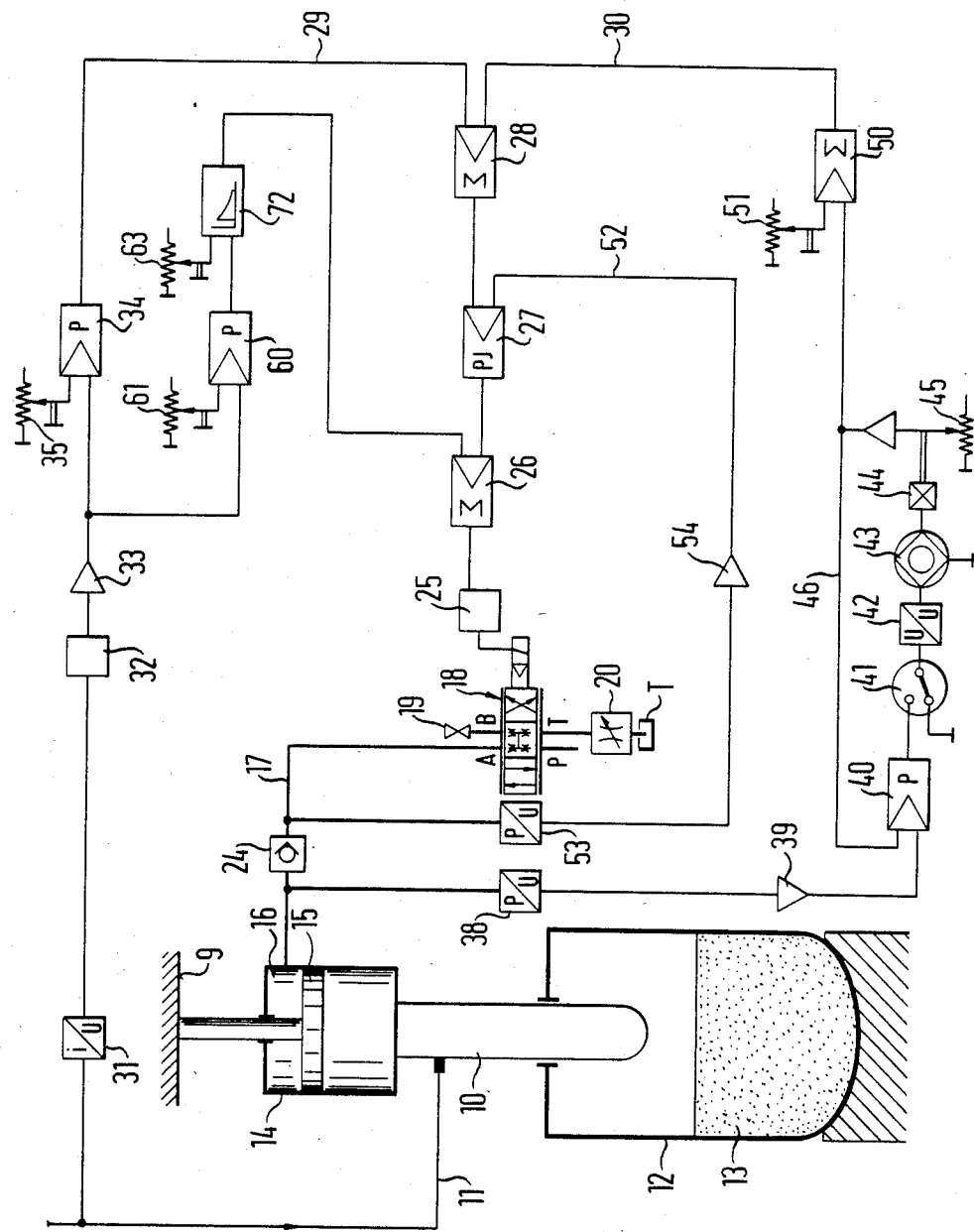

CONTROL APPARATUS FOR CONTROLLING MOVEMENTS OF AN ELECTRODE IN AN ELECTRIC ARC FURNACE

BACKGROUND OF THE INVENTION

The present invention relates in general to a control apparatus for controlling movements of an electrode in an electric arc furnace, wherein a hydraulic cylinder is provided to adjust the electrode, the operating chamber of said cylinder being connected to a pressure source or to reservoir via a valve which is actuated by a control signal which is produced in comparing the actual value and a desired value of the electric arc current.

It is known in the art of adjusting an electrode of an electric arc furnace to maintain the electrical current of the arc as constant as possible by either manually or automatically adjusting the current depending on requirements of operation. The control signal produced in a comparison circuit to which the actual value and the desired value of the electrical current are fed controls a servo valve which connects the hydraulical cylinder either to a pressure source or to reservoir to thus raise or lower the electrode to keep the current constant.

The electric arc can be ignited only after the electrode touches upon conductive material to be melted. As the operating chamber of the cylinder is connected to the reservoir for lowering the electrode, fluid is displaced out from the operating chamber to the reservoir via the valve in the moment of touch-down of the electrode. It is apparent that the electrode is thus not hydraulically supported. This is a substantial drawback since the electrode may sink down in an uncontrolled movement. This results in the danger of overcurrent, short-circuit or breakage of the electrode.

SUMMARY OF THE INVENTION

It is an object of the present invention to provide control apparatus to improve the accuracy of the electrode movement.

It is a further object to increase the safety of operation.

The present invention more specifically relates to measuring the pressure in the operating chamber of the hydraulic cylinder which pressure signal is fed to the control circuit as a feedback signal in addition to the control signal which is current-responsive.

According to the present invention, the control is not only current-responsive, but additionally responsive to the hydraulic pressure in the cylinder. In response to the pressure prevailing in the operating chamber of the cylinder, a control of the electrode adjustment is possible before the electric arc has been ignited. This operation ensures that the electrode is stably hydraulically supported since a pressure release in the operating chamber is prevented by the pressure-responsive feedback signal, as the electrode is placed on the material to be melted. As a result of the hydraulic support which is maintained under all conditions of operation the electrode cannot sink down and thus an electric arc current too high is prevented which might lead to interrupting the arc or switching off the electric furnace.

According to a further feature of the present invention the control circuit additionally provides for a basic signal which is responsive to the respective weight of the electrode which is e.g. determined by the electrode wear. To accomplish this, the static pressure in the operating chamber of the cylinder is measured before starting the control operation, which pressure is required to hold the electrode at a predetermined height. The voltage signal corresponding to said static pressure is reduced by a predetermined constant signal corresponding to a predetermined lowering speed. The output signal thus produced represents the basic signal which is fed to the control circuit and causes lowering of the electrode with a predetermined speed. This constant basic signal which is determined in a calibrating operation before starting the electrode control is persistently fed to the control circuits during the operation thereof. However, the circuit for determining the basic signal is inactivated during the control operation since the basic signal shall only account for the static pressure required to hold the electrode. This feature results in the advantage that lowering the electrode takes place with an automatically adjustable speed which is determined by the electrode weight before the arc is ignited. This again decreases the danger of breaking the electrode in lowering and seating on the material to be melted. Furthermore, the control to keep the electric arc current constant is substantially refined by using the basic signal superimposing the current-responsive control signal.

According to a still further embodiment of the control circuit according to the present invention, in case of a short-circuit the pressure-responsive circuit above referred to is overriden and the electrode immediately raised with maximum speed until the breakdown is cleared and the control operation may be started again.

BRIEF DESCRIPTION OF THE DRAWINGS

Other objects and advantages of the present invention will become apparent to those skilled in the art from the following detailed description of the preferred embodiment of the invention wherein the single FIGURE shows a schematic view of an electrode control apparatus.

DETAILED DESCRIPTION OF THE PREFERRED EMBODIMENT

An electrode 10 being connected to a current bus 11 extends into an electric arc furnace 12 accomodating material 13 to be melted. A hydraulic cylinder 14 is provided to axially adjust the electrode 10. The cylinder 14 houses a piston 15 which is secured to some stationary structure as indicated at the reference numeral 9. The cylinder 14 is connected to the electrode 10. The operating chamber of the cylinder carries the numeral 16.

The operating chamber 16 is connected through a line 17 to a pressure servo valve 18 which reduces the input pressure to an output pressure proportional to an electrical input signal. In the intermediate neutral position of the servo valve both connections A and B are closed off. In displacing the valve spool in either direction the connection A is either connected to a pressure source P or to reservoir T, wherein the connection B remains closed by a valve 19. The raising or, respectively, lowering speed of the electrode 10 is controlled by feeding a corresponding electrical signal to the valve 18. The maximum lowering speed is limited by a volume control valve 20 which is adjusted to a fixed value. A check valve 24 is still provided in the line 17 which check valve is pilot-operated to be opened.

The control circuit comprises a driver circuit 25 to operate the three-position servo valve 18, a summing circuit 26, a pressure control circuit 27 which is defined to be a proportional integral control circuit and a further summing circuit 28 which is connected to a pair of input lines 29 and 30.

The current being supplied to the electrode 10 through the line 11 is measured in a current transformer 31 and converted to a voltage signal in converter circuit 32. The voltage signal is fed through the amplifier 33 to a control circuit 34 in which the voltage signal is compared with a desired value of the current which is adjusted by the potentiometer 35. The output signal of the control circuit 34 is a control signal which is fed to the summing circuit 28 through the line 29.

A basic signal defined by a constant value appears on the second input line 30 of the summing circuit 28. The value of the basic signal is determined by the static pressure in the operating chamber in response to the weight of the electrode before the control operation is started. Initially the check valve 24 is closed and the electrode is in a raised position. The pressure in chamber 16 is measured by a pressure sensor 38 and the corresponding electrical signal is fed through an amplifier 39 to a position control circuit including a control amplifier 40. The output signal of the position control circuit control amplifier 40 is fed via a switch 41 and a converter 42 to an electrical motor 43 which drives a potentiometer 45 through a suitable gear 44. The voltage adjusted at the potentiometer 45 is fed via a line 46 to a second input of the position control circuit which is thus allowed to compare the voltage of the pressure sensor 38 and the voltage on line 46, wherein the potentiometer voltage on line 46 is adjusted so that the output signal of the position control circuit control amplifier 40 goes zero. The line 46 is connected to a summing circuit 50 in which a correcting signal adjusted at the potentiometer 51 is subtracted therefrom. The voltage on line 46 thus corresponds to the static pressure prevailing in the operating chamber which is required to maintain the electrode in its position. The correcting signal which is adjusted at the potentiometer 51 is selected such that after opening the check valve 24 a predetermined lowering movement of the electrode 10 takes place when the servo valve 18 connects the line 17 to the reservoir T. The basic signal thus appears on line 30 which signal effects a predetermined lowering motion which corresponds to the electrode weight. The maximum lowering speed of the electrode is limited by the valve 20 which is fixedly adjusted at a predetermined volume.

For starting the control operation of the electrode the switch 41 is opened so that a further adjustment of the potentiometer 45 is interrupted and thus disabled while continuously feeding the basic signal initially determined to the summing circuit 28. The check valve 24 is open. In the summing circuit 28 the basic signal corresponding to a predetermined lowering speed is superimposed to the current-responsive control signal of the controller 34. The output signal of the summing circuit 28 is fed to the pressure control circuit 27 which further receives a pressure-responsive feedback signal on line 52. To produce the feedback signal the pressure is measured in the pressure sensor 53 which is connected to the line 17. When the check valve 24 is opened, thus during the control operation of the electrode, the pressure in the chamber 16 or, respectively, in the line 17 is measured and a corresponding signal is fed through an amplifier 54 to the pressure control circuit 27. The output signal of the pressure control circuit 27 is fed through a summing circuit 26 to the driver circuit 25 of the valve 18 which is thus adjusted in response to the electric arc current, the basic signal and the respective pressure signal in the operating chamber 16 of the cylinder.

The control circuit according to the present invention thus prevents a lowering of the electrode too fast whereby the danger of electrode breakage is eliminated when the electrode comes down on the material to be melted. It is further avoided that in lowering and seating the electrode the pressure in the chamber 16 is released due to the hydraulic fluid returning through the valve 18 to the reservoir so that supporting the electrode is not obtained any more by the hydraulic pressure in the cylinder; this situation is dangerous as the electrode may suddenly sink down and the electric arc current then tends to become too high. There is a further advantage that the arc current can be controlled within smaller limits in response to the weight of the electrode, as the control of the summing circuit 28 to maintain constant the current is superimposed by the basic signal.

In parallel to the current control of the circuit 34, a control amplifier 60 is provided to compare the actual value of the current with a threshold value adjusted at the potentiometer 61. When the threshold signal is exceeded, the output signal of the control amplifier 60 is fed to a differentiating amplifier 72, wherein the decay time of the signal supplied from the amplifier 60 is selected at a potentiometer 63. The output signal of the amplifier 72 is fed to the summing circuit 26. In case of a short circuit, the current-responsive and pressure-responsive control circuit 27 is thus overruled and the driver circuit 25 is directly controlled through the summing circuit 26 so that the electrode is raised with a maximum speed. When the short-circuit is cleared, the signal delivered by the amplifier 72 gradually decreases, until the current- and pressure-responsive control is re-installed through the summing circuit 28 and the amplifier 72.

What we claim is:

1. A control apparatus axially adjusting the vertical position of an electrode of an electric arc furnace, comprising a hydraulic cylinder operatively connected to the electrode to adjust the electrode position, a valve selectively connects the operating chamber of said hydraulic cylinder to either a pressure source or to a reservoir to selectively raise or lower the electrode and an electrical control circuit supplying a current responsive control signal to said valve to operate said valve, said current responsive control signal being produced by comparing the actual value of the electric arc current with a desired value, the improvement comprising means measuring the pressure in the operating chamber of said hydraulic cylinder and generating a pressure signal and feeding said pressure signal to said control circuit in addition to said current responsive control signal to control said valve in response to both pressure and current.

2. The control apparatus of claim 1 characterized by means producing a weight responsive basic signal corresponding to the weight of the electrode before adjusting the vertical position, by measuring static pressure in the operating chamber of the hydraulic cylinder, means subtracting a predetermined correcting signal from said weight responsive basic signal and means feeding the electrical signal resulting from said subtraction to said control circuit to initiate the vertical position adjustment.

3. The control apparatus of claim 2 characterized in that the electrical control circuit includes a summing circuit, the weight-responsive basic signal and the current-responsive control signal are fed to said summing circuit and the output signal of said summing circuit and the pressure signal are fed to a pressure control circuit.

4. The control apparatus of claim 2 characterized in that means are provided in a pressure line between the hydraulic cylinder and a hydraulic pressure source closing the communication therebetween to determine the weight-responsive basic signal and further including a pressure sensor measuring the pressure in the operating chamber connected between the operating chamber of the hydraulic cylinder and said means closing the communication between said pressure line and said hydraulic cylinder.

5. The control apparatus of claim 4 characterized in that the pressure sensor has its output connected to a comparison circuit, the output signal of said comparison circuit being fed to a drive means of a potentiometer, the potentiometer voltage being fed to the second input of said comparison circuit and to a summing circuit, said second input receiving a correcting signal and the output signal representing said basic signal.

6. The control apparatus of claim 5 characterized in that the means closing communication between the pressure line and the hydraulic cylinder comprises a check valve provided in the pressure line of the operating chamber of the cylinder, means opening said check valve before the adjustment of the vertical position is started and means disabling the means adjusting the vertical position when said check valve is opened whereby the basic signal appears as a constant signal on the summing circuit of the control circuit.

7. The control apparatus of claim 3 characterized in that a further summing circuit is provided between the pressure control circuit and a driving circuit for the valve, a second input of said further summing circuit being connected to an overcurrent circuitry which generates a signal to raise the electrode with maximum speed when a condition of overcurrent occurs.

8. The control apparatus of claim 7 characterized in that the overcurrent circuitry comprises a comparison circuit and a differentiating amplifier, the comparison circuit being supplied with a signal representing the actual value of the electric arc current and with a reference signal and wherein the decay time of the output signal of the differentiating amplifier is adjustable.

9. The control apparatus of claim 1 characterized in that the valve comprises a pressure servo valve and further including a pilot-operated check valve provided in the pressure line between the operating chamber of the cylinder and the pressure servo valve functions as a three-position servo valve.

10. The method controlling the vertical position of an electrode of an electrical arc furnace in which the electrode is positioned by a hydraulic cylinder comprising the steps of measuring the difference between the actual current generated by the electrode and the desired current and adjusting the vertical position of the electrode in response to the difference to maintain the desired current, measuring the static fluid pressure in the hydraulic cylinder before the electrode position is adjusted, and adjusting the vertical position of the electrode in response to variations in the measured static fluid pressure in the hydraulic cylinder.

11. The method as set forth in claim 10 further including the steps of measuring the fluid pressure required in the hydraulic cylinder to maintain the electrode in a preset position, subtracting a predetermined value from the measured pressure and initiating the feed of the electrode at a rate determined by the resulting difference.

12. The method as set forth in claim 10 further including the step of rapidly withdrawing the electrode if the measured actual current exceeds a predetermined value.

* * * * *